US009634731B2

United States Patent
Jung et al.

(10) Patent No.: US 9,634,731 B2
(45) Date of Patent: Apr. 25, 2017

(54) WIRELESS POWER TRANSMITTER

(71) Applicant: LG INNOTEK CO., LTD., Seoul (KR)

(72) Inventors: Woo Kil Jung, Seoul (KR); Su Ho Bae, Seoul (KR); Hyoung Rae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 307 days.

(21) Appl. No.: 13/835,817

(22) Filed: Mar. 15, 2013

(65) Prior Publication Data

US 2013/0241305 A1   Sep. 19, 2013

(30) Foreign Application Priority Data

Mar. 19, 2012 (KR) .................. 10-2012-0027979
Jun. 7, 2012 (KR) .................. 10-2012-0060781

(51) Int. Cl.
*H04B 5/00* (2006.01)

(52) U.S. Cl.
CPC ......... *H04B 5/0037* (2013.01); *H04B 5/0087* (2013.01)

(58) Field of Classification Search
CPC ....... H04B 5/0037; H04B 5/0087; H04B 5/00
USPC .................. 307/104; 320/108; 336/208
See application file for complete search history.

(56) References Cited

U.S. PATENT DOCUMENTS

| 2002/0110013 | A1 | 8/2002 | Park et al. | |
| 2011/0127953 | A1* | 6/2011 | Walley et al. | 320/108 |
| 2011/0254378 | A1* | 10/2011 | Ichikawa et al. | 307/104 |
| 2012/0049645 | A1* | 3/2012 | Kozakai | 307/104 |
| 2012/0119699 | A1* | 5/2012 | Carbunaru et al. | 320/108 |

FOREIGN PATENT DOCUMENTS

| JP | 2001-086652 A | 3/2001 |
| JP | 2002-262468 A | 9/2002 |
| KR | 10-2012-0017526 A | 2/2012 |

OTHER PUBLICATIONS

Notice of Allowance dated Sep. 13, 2013 in Korean Application No. 10-2012-0027979, filed Mar. 19, 2012.
Office Action dated Jan. 27, 2014 in Korean Application No. 10-2012-0060781.

\* cited by examiner

*Primary Examiner* — Adi Amrany
(74) *Attorney, Agent, or Firm* — Saliwanchik, Lloyd & Eisenschenk

(57) ABSTRACT

Disclosed is a wireless power transmitter. The wireless power transmitter for transmitting power to a wireless power receiver in a wireless scheme, includes a transmission circuit unit converting power supplied from a power supply unit into power having a frequency for resonance; a transmission induction coil coupling the converted power; and a transmission resonance coil disposed adjacent to the transmission induction coil to transfer the coupled power from the transmission induction coil to the wireless power receiver using the resonance, wherein the transmission circuit unit is vertically spaced apart from the transmission resonance coil.

6 Claims, 8 Drawing Sheets

| Height | Quality Factor | Efficiency(%) |
|---|---|---|
| 0mm | 560 | 18 |
| 5mm | 630 | 20 |
| 10mm | 680 | 21 |
| 15mm | 700 | 22 |
| 20mm | 710 | 23 |
| 25mm | 712 | 23 |
| 30mm | 712 | 23 |
| 35mm | 712 | 23 |
| 40mm | 712 | 23 |
| 45mm | 712 | 23 |

FIG.13

| Angle | Q factor | Coupling coefficient (Front side) | Front side(%) | Lateral side(%) | Back side(%) |
|---|---|---|---|---|---|
| 0 | 712 | 0.12 | 25 | 25 | 25 |
| 3 | 680 | 0.13 | 26.5 | 24.5 | 23.5 |
| 6 | 650 | 0.13 | 27 | 24 | 21 |
| 9 | 620 | 0.14 | 27.5 | 23.5 | 19.5 |
| 12 | 580 | 0.15 | 28 | 23 | 18 |
| 15 | 540 | 0.15 | 28.5 | 22 | 16.5 |
| 18 | 500 | 0.16 | 29 | 21.5 | 15 |
| 21 | 460 | 0.17 | 29.5 | 21 | 13.5 |
| 24 | 420 | 0.18 | 30 | 20.5 | 11 |
| 27 | 380 | 0.19 | 30.5 | 20 | 10 |
| 30 | 330 | 0.21 | 30.5 | 19.5 | 9 |
| 33 | 290 | 0.22 | 30 | 19 | 8 |
| 36 | 250 | 0.24 | 29.5 | 18.5 | 7.5 |
| 39 | 230 | 0.25 | 29 | 18 | 7 |

WIRELESS POWER TRANSMITTER

CROSS-REFERENCE TO RELATED APPLICATIONS

This application claims the benefit under 35 U.S.C. §119 of Korean Patent Application Nos. 10-2012-0027979, filed Mar. 19, 2012 and 10-2012-0060781, filed Jun. 7, 2012, which are hereby incorporated by reference in their entirety.

BACKGROUND

The disclosure relates to a wireless power transmitting technology. More particularly, the embodiment relates to a wireless power transmitter capable of increasing power transmission efficiency by improving a structure of the wireless power transmitter, and a wireless power transmission system.

A wireless power transmission or a wireless energy transfer refers to a technology of wirelessly transferring electric energy to desired devices. In the 1800's, an electric motor or a transformer employing the principle of electromagnetic induction has been extensively used and then a method of transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to the generation of an electric current through induction of a voltage when a magnetic field is changed around a conductor. The electromagnetic induction scheme has been successfully commercialized for electronic appliances having small sizes, but represents a problem in that the transmission distance of power is too short.

Besides the electromagnetic induction scheme, the long-distance transmission using the resonance and the short-wavelength radio frequency has been suggested as the wireless energy transfer scheme.

Recently, among wireless power transmitting technologies, an energy transmitting scheme employing resonance has been widely used.

Since an electric signal generated between the wireless power transmitter and the wireless power receiver is wirelessly transferred through coils in a wireless power transmitting system using resonance, a user may easily charge electronic appliances such as a portable device.

However, according to the related art, there is limitation to increase a Quality factor (Q) and power transmission efficiency between a transmitter side and a receiver side.

BRIEF SUMMARY

The embodiment provides a wireless power transmitter capable of maximizing power transmission efficiency between the wireless power transmitter and a wireless power receiver, and a wireless power transmission system.

The embodiment provides a wireless power transmitter capable of maximizing power transmission efficiency by adjusting disposal intervals between constituent elements of the wireless power transmitter, and a wireless power transmission system.

The embodiment provides a wireless power transmitter capable of maximizing power transmission efficiency by disposing a first substrate and a second substrate of the wireless power transmitter, and a wireless power transmission system.

The embodiment provides a wireless power transmitter capable of increasing power transmission efficiency by disposing a transmission resonance coil to have a predetermined angle, and a wireless power transmitting system.

According to the embodiment, there is provided a wireless power transmitter for transmitting power to a wireless power receiver in a wireless scheme, the wireless power transmitter including: a transmission circuit unit converting power supplied from a power supply unit into power having a frequency for resonance; a transmission induction coil coupling the converted power; and a transmission resonance coil disposed adjacent to the transmission induction coil to transfer the coupled power from the transmission induction coil to the wireless power receiver using the resonance, wherein the transmission circuit unit is vertically spaced apart from the transmission resonance coil.

According to the embodiment, there is provided a wireless power transmitter for transmitting power to a wireless power receiver in a wireless scheme, the wireless power transmitter including: a transmission induction coil transmitting power from a power supply unit; a transmission resonance coil induction-coupled with the transmission induction coil transmitting the power from the transmission induction coil to the wireless power receiver, and the transmission resonance coil is inclined at a predetermined angle with respect to a horizontal plane.

According to the embodiments, following effects can be achieved.

First, power transmission efficiency can be maximized by adjusting disposal intervals between constituent elements of the wireless power transmitter.

Second, the power transmission efficiency can be maximized through the arrangement of a transmission resonance coil and a second substrate of the wireless power transmitter.

Third, the power transmission efficiency to a receiver side can be increased by disposing the wireless power transmitter to have a predetermined angle.

Meanwhile, other various effects may be directly or indirectly disclosed in the following description of the embodiment of the disclosure.

BRIEF DESCRIPTION OF THE DRAWINGS

FIG. 13 is a table illustrating power transmission efficiency when the wireless power transmitter according to the third embodiment is used.

DETAILED DESCRIPTION

Hereinafter, embodiments will be described in detail with reference to accompanying drawings so that those skilled in the art can easily work with the embodiments.

Figure 1:
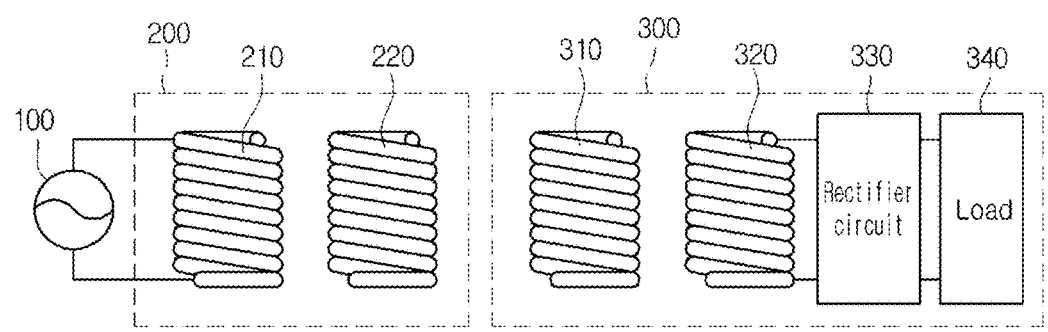
FIG. 1 is a diagram illustrating a wireless power transmission system according to an embodiment.

FIG. 1 is a diagram illustrating a wireless power transmission system according to an embodiment.

Referring to FIG. 1, the wireless power transmission system may include a power source 100, a wireless power transmitter 200, and a wireless power receiver 300.

The wireless power transmitter 200 may include a transmission induction coil 210 and a transmission resonance coil 220.

The wireless power receiver 300 may include a reception resonance coil 310, a reception induction coil 320, a rectifier circuit 330, and a load 340.

Both terminals of the power source 100 are connected to both terminal of the transmission induction coil 210, respectively.

The transmission resonance coil 220 may be spaced apart from the transmission induction coil 210 by a predetermined distance.

The reception resonance coil 310 may be spaced apart from the reception induction coil 320 by a predetermined distance.

Both terminals of the reception induction coil 320 are connected to both terminal of the rectifier circuit 330, respectively. Both terminals of the load 340 are connected to both terminal of the rectifier circuit 330, respectively. In the embodiment, the load 340 may be not included in the wireless power receiver 300, but may be provided separately.

The power generated from a power source 100 is provided to the wireless power transmitter 200, such that the power is transferred by resonance to the wireless power receiver 300 which is resonant with the wireless power transmitter 200, that is, which has the same resonant frequency value as that of the wireless power transmitter 200.

Hereinafter, a procedure of transmitting power will be described in detail.

The power source 100 is an AC power source for supplying AC power of a predetermined frequency.

AC current flows through the transmission induction coil 210 by the AC current from the power source 100. When the AC current flows through the transmission induction coil 210, the AC current may be induced to the transmission resonance coil 220 physically spaced apart from the transmission induction coil 210 using electromagnetic induction. The power transferred to the transmission resonance coil 220 is transmitted using resonance to the wireless power receiver 300 which forms a resonance circuit with the wireless power transmitter 200.

Power may be transferred using resonance between two LC circuits which are impedance-matched with each other. The power transfer using resonance is able to transfer power at higher efficiency to a longer distance than those by electromagnetic induction.

The reception resonance coil 310 receives power using resonance from the transmission resonance coil 220. The AC current flows through the reception resonance coil 310 by the received power. The power transmitted to the reception resonance coil 310 is transferred by electromagnetic induction to the reception induction coil 320. The power transferred to the reception induction coil 320 is transferred through the rectifier circuit 330 to the load 340.

Figure 2:
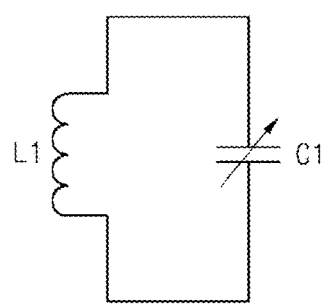
FIG. 2 is a circuit diagram showing an equivalent circuit of a transmitting induction coil according to an embodiment.

FIG. 2 is a circuit diagram showing an equivalent circuit of a transmitting induction coil 210 according to an embodiment.

As shown in FIG. 2, the transmission induction coil 210 may include an inductor L1 and a capacitor C1, and form a circuit having a suitable inductance value and a suitable capacitance value.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the variable capacitor. The equivalent circuit of the transmission resonance coil 220, the reception resonance coil 310, and the reception induction coil 320 may be the same as those depicted in FIG. 2.

Figure 3:
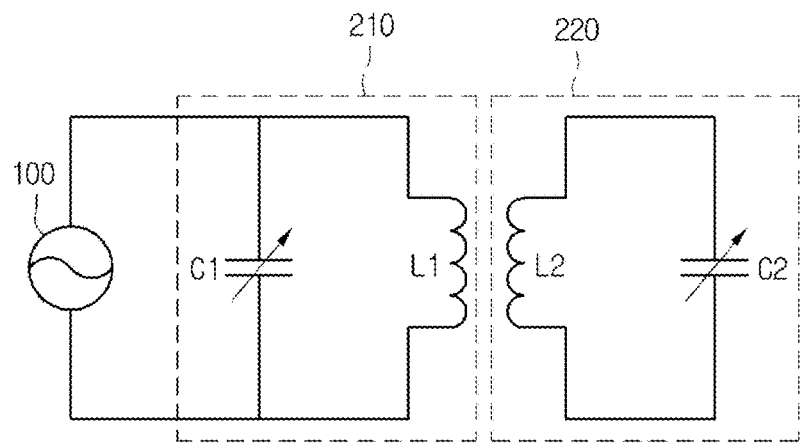
FIG. 3 is a circuit diagram showing an equivalent circuit of a power source and a wireless power transmitter according to an embodiment.

FIG. 3 is a circuit diagram showing an equivalent circuit of a power source 100 and a wireless power transmitter 200 according to an embodiment.

As shown in FIG. 3, each of the transmission induction coil 210 and the transmission resonance coil 220 may include an inductor L1 or L2 having predetermined inductance and a capacitor C1 or C2 having predetermined capacitance.

Figure 4:
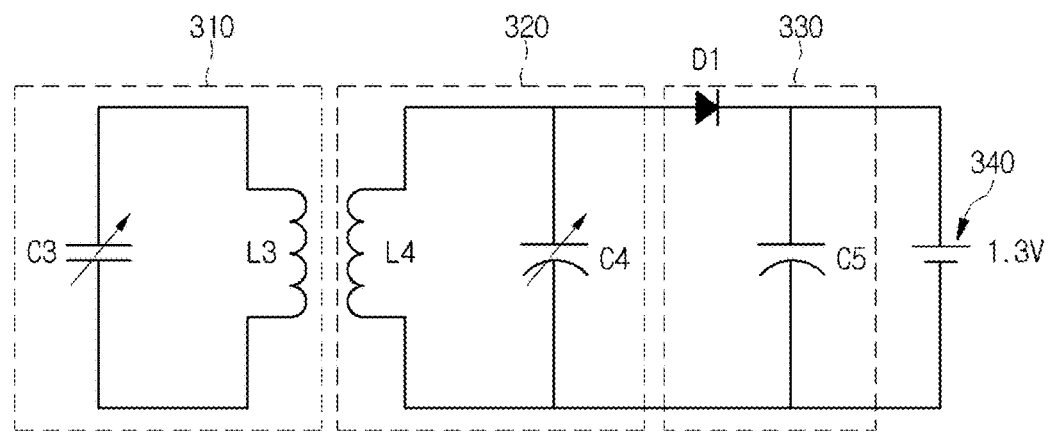
FIG. 4 is a circuit diagram showing an equivalent circuit of a wireless power receiver according to an embodiment.

FIG. 4 is a circuit diagram showing an equivalent circuit of a wireless power receiver 300 according to an embodiment.

As shown in FIG. 4, each of the reception resonance coil 310 and the reception induction coil 320 may include an inductor L3 or L4 having a predetermined inductance value and a capacitor C3 or C4 having a predetermined capacitance value.

The rectifier circuit 330 may include a diode D1 and a rectifying capacitor C5 such that the rectifier circuit 330 converts alternating current (AC) power into direct current (DC) power and outputs the DC power. The rectifying unit 330 may include a rectifier and a smoothing circuit. The rectifier may include a silicon rectifier as a rectifying element. The smoothing circuit smoothes the output of the rectifier.

Although the load 340 is denoted as 1.3 V DC power, the load 340 may be a battery or other devices requiring DC power. The embodiment is not limited to 1.3 V.

Figure 5:
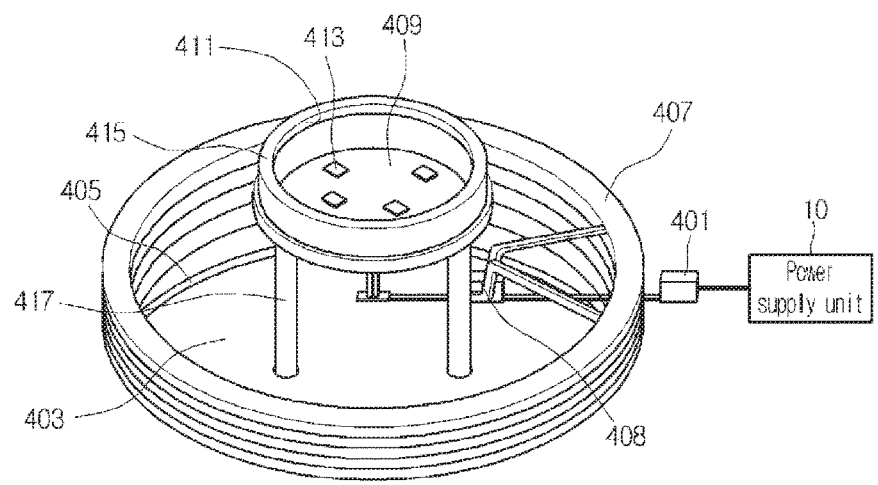
FIG. 5 is a view illustrating a structure of a wireless power transmission system according to a first embodiment.

FIG. 5 is a view illustrating a structure of a wireless power transmission system 400 according to a first embodiment.

The wireless power transmitter 400 according to the embodiment may efficiently transmit power when a receiver side is located at the lateral side rather than the upper side of the wireless power transmitter 400.

Referring to FIG. 5, the wireless power transmitter 400 includes a power connecting unit 401, a first substrate 403, a transmission induction coil 405, a transmission resonance coil 407, a second substrate 409, a shielding unit 411, a transmission circuit unit 413, a receiving unit 415, and a support member 417.

A power supplying unit 10 may supply DC power to the wireless power transmitter 400.

The power supplying unit 10 may be included in the wireless power transmitter 400.

The power connecting unit 401 may transfer the power supplied from the power supplying unit 10 to the transmission induction coil 405. In the embodiment, the power connecting unit 401 may be disposed adjacent to one side of a transmission resonance coil 407 to be described later. The power supplied from the power supplying unit 10 may be DC power.

In the embodiment, the power connecting unit 401 may be disposed on the first substrate 403, which will be described with reference to FIG. 7 in detail.

The first substrate 403 may include a printed circuit board (PCB).

The transmission induction coil 405 may be disposed on the first substrate 403. In one embodiment, when the first substrate 403 has a circular shape, the transmission induction coil 405 may be disposed along an outer contour line of the first substrate 403. The first substrate having the circular shape is illustrative purpose only and the first substrate 403 may have a polygonal shape such as a rectangular shape. A shape of the transmission induction coil 405 disposed on the first substrate 403 may be changed according to the shape of the first substrate 403.

The transmission induction coil 405 may be provided by winding a conductive wire several times, and may be disposed by forming a predetermined pattern on the first substrate 403. In the embodiment, the transmission induction coil 405 may have a spiral structure or a helical structure, but the embodiment is not limited thereto.

The transmission induction coil 405 may transfer power supplied from the power supplying unit 10 to the transmission resonance coil 407 physically spaced apart from the transmission induction coil 405 using electromagnetic induction.

The transmission induction coil 405 may be connected to a capacitor 408 of the transmission resonance coil 407 through a feeding line on the first substrate 403.

The transmission resonance coil 407 may receive power from the transmission induction coil 405 using electromagnetic induction.

The transmission resonance coil 407 may be disposed vertical to the transmission induction coil 405. In the embodiment, the transmission resonance coil 407 and the transmission induction coil 405 may be spaced apart from each other by a predetermined vertical distance.

As shown in FIG. 5, in the embodiment, the transmission induction coil 407 may be laminated by winding a conductive wire several times. The transmission resonance coil 407 may have various shapes such as a spiral shape or a helical shape with a predetermined diameter.

The transmission resonance coil 407 may transmit power to a reception resonance coil (not shown) of a wireless power receiver (not shown) using resonance.

The shielding unit 411, the second substrate 409, and the transmission circuit unit 413 may be sequentially disposed on the receiving unit 415 in the upward direction.

The transmission circuit unit 413 may convert the power supplied from the power supplying unit 10 into power having a frequency for resonance.

The transmission circuit unit 413 may include a DC-DC converter, an oscillator, and an AC power generating unit.

The DC-DC may convert the power from the power supplying unit 10 into desired output power.

The oscillator may generate an AC signal having a resonance frequency.

The AC power generating unit outputs amplified AC power using the AC power received from the DC-DC converter and the AC signal received from the oscillator. The amplified AC power may be transferred to the transmission induction coil 405.

The transmission circuit unit 413 may be disposed on the second substrate 409. The transmission circuit unit 413 may be the form of a chip, and may include a plurality of chips. The second substrate 409 may include a PCB. In the embodiment, the second substrate 409 may have a circular shape, but the embodiment is not limited thereto.

When the second substrate 409 has the circular shape, the transmission circuit unit 413 may be on the second substrate 409.

Hereinafter, a second substrate 409 having a circular shape will be described as one example.

The ratio of a diameter of the second substrate 409 to a diameter of the transmission resonance coil 407 may have a predetermined value. In the embodiment, the ratio of a diameter of the second substrate 409 to a diameter of the transmission resonance coil 407 may be 3.8 or less. It is preferable that the ratio of a diameter of the second substrate 409 to a diameter of the transmission resonance coil 407 may be 3.8. When the transmission resonance coil 407 has a coaxial spiral type helical structure, the diameter of the transmission resonance coil 407 may signify a distance between one point of an outermost wire passing through a center of the transmission resonance coil 407 and an opposite point of the outermost wire.

The second substrate 409 may be spaced apart from the transmission resonance coil 407 by a predetermined vertical distance. In the embodiment, it may be preferable that the vertical distance is in the range of 5 mm to 25 mm or less.

The ratio of a diameter of the second substrate 409 to a diameter of the transmission resonance coil 407 and the vertical distance between the second substrate 409 are associated with a quality factor Q and power transmission efficiency. The quality factor Q is a reciprocal of energy loss per unit time of the wireless power transmission system. The performance of the power transmission system can be gradually improved as the value of the quality factor Q is increased. The power transmission efficiency may signify the ratio of power received by the wireless power receiver to power transmitted from the wireless power transmitter 400.

In the embodiment, the quality factor Q and the power transmission efficiency may be changed according to variation in the vertical distance between the second substrate 409 and the transmission resonance coil 407.

In another embodiment, the quality factor Q and the power transmission efficiency may be changed if the vertical distance between the second substrate 409 and the transmission resonance coil 407 is changed in a state that the ratio of a diameter of the second substrate 409 to a diameter of the transmission resonance coil 407 is 3:8. A detailed description thereof will be given later.

The receiving unit 415 may receive a shielding unit 411, a second substrate 409, and a transmission circuit unit 413. In the embodiment, the receiving unit 415 may have a cylindrical shape including an open top surface and a bottom surface with a predetermined diameter.

The shielding unit 411 may change a direction of a magnetic flux formed in the transmission resonance coil 407. The shielding unit 411 will be described in detail below.

At least one support member 417 may vertically connect the receiving unit 415 to the first substrate 403.

Hereinafter, the following is the arrangement between constituent elements of the wireless power transmitter 400 according to the embodiment.

Figure 6:
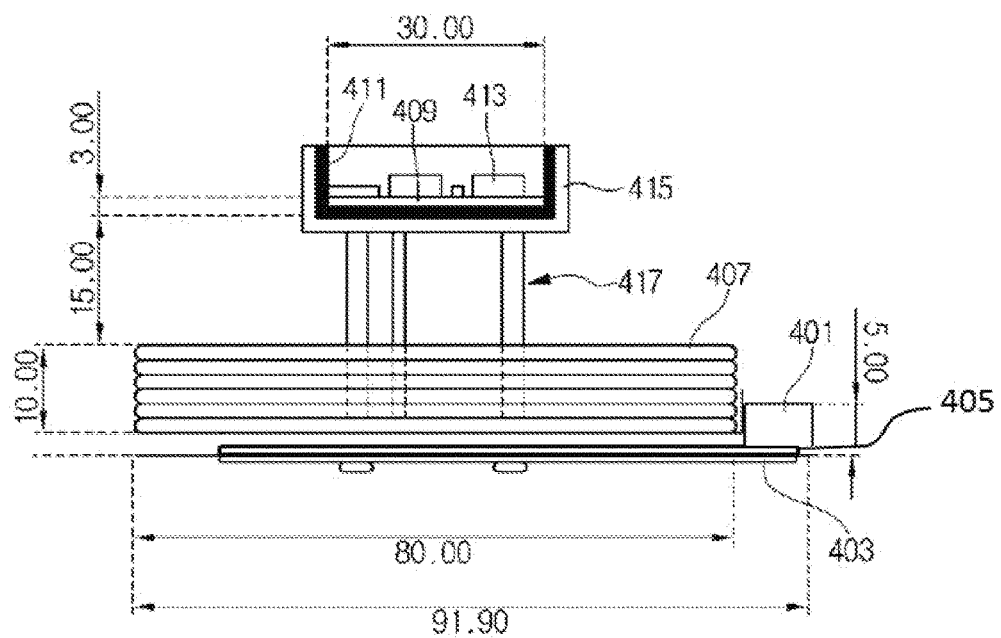
FIG. 6 is a front view illustrating the wireless power transmission system according to a first embodiment.

FIG. 6 is a front view illustrating the wireless power transmission system 400 according to a first embodiment.

Referring to FIG. 6, the wireless power transmitter 400 may include a power connecting unit 401, a first substrate 403, a transmission induction coil 405, a transmission resonance coil 407, a second substrate 409, a shielding unit 411, a transmission circuit unit 413, and a support member 417.

Constituent elements of the wireless power transmitter 400 have the same functions as those of the constituent elements of the wireless power transmitter shown in FIG. 5 described above, and thus the detailed description thereof is omitted. The following description will be made while focusing on the arrangement of respective constituent elements.

The first substrate 403 is disposed at the lowermost end of the wireless power transmitter 400.

The transmission induction coil 405 may be disposed on the first substrate 403.

The transmission resonance coil 407 may be spaced apart from the transmission induction coil 405 by a predetermined vertical distance.

The transmission induction coil 405 may be provided by winding a conductive wire several times while being laminated.

A height of the transmission resonance coil 407 may be 10 mm, but the embodiment is not limited thereto.

The power connecting unit 401 is provided at one terminal of the transmission resonance coil 407. A height of the power connecting unit 401 may be 10 mm, but the embodiment is not limited thereto.

The second substrate 409 may be spaced apart from the transmission resonance coil 407 by a predetermined vertical distance. The vertical distance between the second substrate 409 and the transmission resonance coil 407 may be in the range of 5 mm to 25 mm, preferably, be 15 mm. The embodiment is not limited to 15 mm.

The transmission circuit unit 413 including a plurality of chips may be disposed on the second substrate 409.

The second substrate 409 may have a circular shape.

The shielding unit 411 may have a cylindrical shape including an open top surface capable of the second substrate 409.

The receiving unit 415 is disposed adjacent to a lower side of the shielding unit 411, and may have a cylindrical shape including an open top surface.

The shielding unit 411 may change a direction of a magnetic flux formed in the transmission resonance coil 407 to a location at which the wireless power receiver is provided. Accordingly, the magnetic flux formed in the transmission resonance coil 407 may be more concentrated onto the wireless power receiver side. Preferably, when the wireless power receiver is disposed at a lateral side of the wireless power transmitter 400, the shielding unit 411 may transfer the magnetic flux to the wireless power receiver side by changing a direction of the magnetic flux formed in the transmission resonance coil 407.

Further, the shielding unit 411 may change the direction of the magnetic flux formed in the transmission resonance coil 407 to inhibit the malfunction of the transmission circuit unit 413. Since the magnetic flux formed in the transmission resonance coil 407 may exert influence upon the transmission circuit unit 413 when the magnetic flux is transmitted to the transmission circuit unit 413, the shielding unit 411 may inhibit the magnetic flux from being transmitted to the transmission circuit unit 413 to protect the transmission circuit unit 413. Particularly, the shielding unit 411 has a cylindrical structure including an open top surface to minimize the influence of the transmission circuit unit 413 caused by a magnetic field formed in the transmission resonance coil 407, thereby inhibiting the malfunction of the transmission circuit unit 413.

The receiving unit 415 may be connected to the first substrate 403 through a plurality of support members 417.

The support members 417 serve to connect and support the first substrate 403 and the receiving unit 415.

When the second substrate 409 has a circular shape, a diameter of the second substrate 409 may be 30 mm and a diameter of the transmission resonance coil 407 may be 80 mm, but the embodiment is not limited thereto. The diameter of the second substrate 409 and the diameter of the transmission resonance coil 407 may be variously set if the ratio of the diameter of the second substrate 409 to the diameter of the transmission resonance coil 407 is kept as 3:8.

Figure 7:
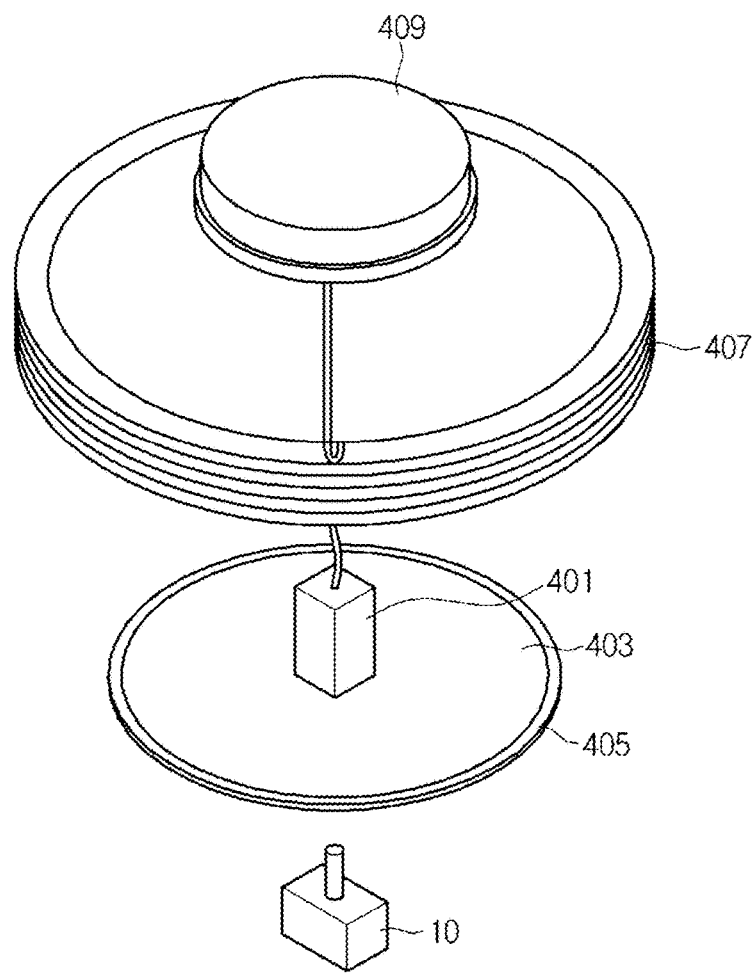
FIG. 7 is a view illustrating a structure of a wireless power transmission system according to a second embodiment.

FIG. 7 is a view illustrating a structure of a wireless power transmission system 400 according to a second embodiment.

Referring to FIG. 7, the wireless power transmitter 400 according to the second embodiment includes a power connecting unit 401, a first substrate 403, a transmission induction coil 405, a transmission resonance coil 407, and a second substrate 409. The wireless power transmitter 400 may further include the constituent elements illustrated in FIG. 5.

When compared with the embodiment shown in FIG. 5, a location of the power connecting unit 401 is changed in the wireless power transmitter 400 according to the second embodiment.

In detail, the power connecting unit 401 of the wireless power transmitter 400 of FIG. 5 is disposed at a lateral side of the first substrate 403 of the transmission resonance coil 407, but the power connecting unit 401 of the wireless power transmitter 400 according to the second embodiment is disposed at a top surface of the first substrate 403.

When the power connecting unit 401 is disposed at the lateral side of the first substrate 403, some magnetic flux formed from the transmission resonance coil 407 and transferred to a receiver side may be absorbed or blocked by the power connecting unit 401, exerting influence upon the power transmission efficiency.

When the power connecting unit 401 is disposed at the top surface of the first substrate 403, the magnetic flux formed from the transmission resonance coil 407 and transferred to the receiver side may not be absorbed or blocked by the power connecting unit 401. That is, due to the arrangement of the power connecting unit 401 as illustrated in FIG. 7, the power transmission efficiency may be increased.

In detail, power transmission efficiency in the arrangement of the power connecting unit 401 of the wireless power transmitter 400 shown in FIG. 7 is increased by 3% and the quality factor is increased by 120 as compared with the arrangement of the power connecting unit 401 of the wireless power transmitter 400 shown in FIG. 5.

Figures 8, 9:
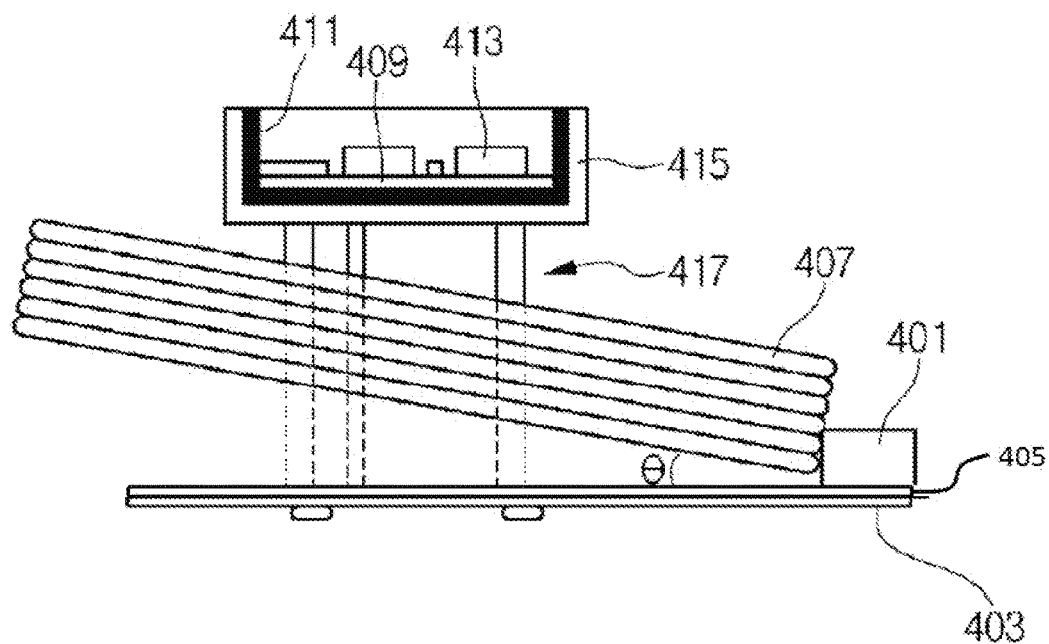
FIG. 8 is a table illustrating variations in a Q value and power transmission efficiency as a function of a vertical distance between a transmission resonance coil and a second substrate of a wireless power transmitter according to the first embodiment.
FIG. 9 is a view illustrating a structure of a wireless power transmitter according to a third embodiment.

FIG. 8 is a table illustrating variations in the Q value and power transmission efficiency as a function of a vertical distance between a transmission resonance coil 407 and a second substrate 409 of a wireless power transmitter 400 according to the embodiment.

It is assumed that a diameter of the second substrate 409 is 30 mm and a diameter of the transmission resonance coil 407 is 80 mm.

Further, it is assumed that the wireless power receiver is disposed at a side of the wireless power transmitter 400 other than an upper side and a lower side the wireless power transmitter 400.

Referring to FIG. 8, when the vertical distance between the transmission resonance coil 407 and the second substrate 409 is 0 mm, the quality factor Q is 560. As the vertical distance is increased, the quality factor Q is increased.

When the vertical distance between the transmission resonance coil 407 and the second substrate 409 is 15 mm, the quality factor Q is 700. When the vertical distance is 20 mm, the quality factor Q is 710. When the vertical distance is 25 mm, the quality factor Q is 712. After that, as the vertical distance is increased, the quality factor Q may become constant. In addition, if the transmission efficiency of power transferred to the receiver side is 18% when the vertical distance between the transmission resonance coil 407 and the second substrate 409 is 0 mm, as the vertical distance is increased, the power transmission efficiency is increased.

When the vertical distance between the transmission resonance coil 407 and the second substrate 409 is 15 mm, the transmission efficiency of power transferred to the receiver side becomes 22%. When the vertical distance is 25 mm, the transmission efficiency of power transferred to the receiver side becomes 23%. When the vertical distance between the transmission resonance coil 407 and the second substrate 409 is equal to or greater than 25 mm, the transmission efficiency of power transferred to the receiver side may not be increased any more.

Meanwhile, if the vertical distance between the transmission resonance coil 407 and the second substrate 409 exceeds 25 mm, it is not preferable in view of the size of the wireless power transmitter 400, so the vertical distance between the transmission resonance coil 407 and the second substrate 409 is preferably set to 25 mm or less.

In this manner, as the vertical distance between the transmission resonance coil 407 and the second substrate 409 is increased, the quality factor Q and the power transmission efficiency may be increased within a predetermined range.

Hereinafter, the wireless power transmitter 400 and the power transmission efficiency according to the third embodiment will be described with reference to FIGS. 9 to 13.

Figure 10:
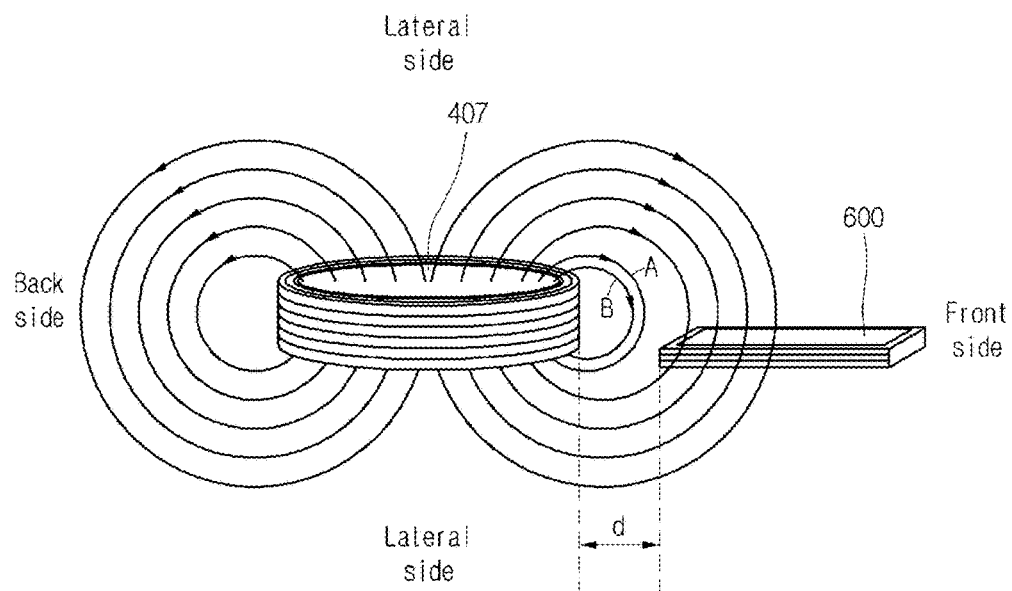
FIG. 10 is a diagram illustrating a wireless power transmission procedure of a wireless power transmitter according to the first embodiment.
Figure 11:
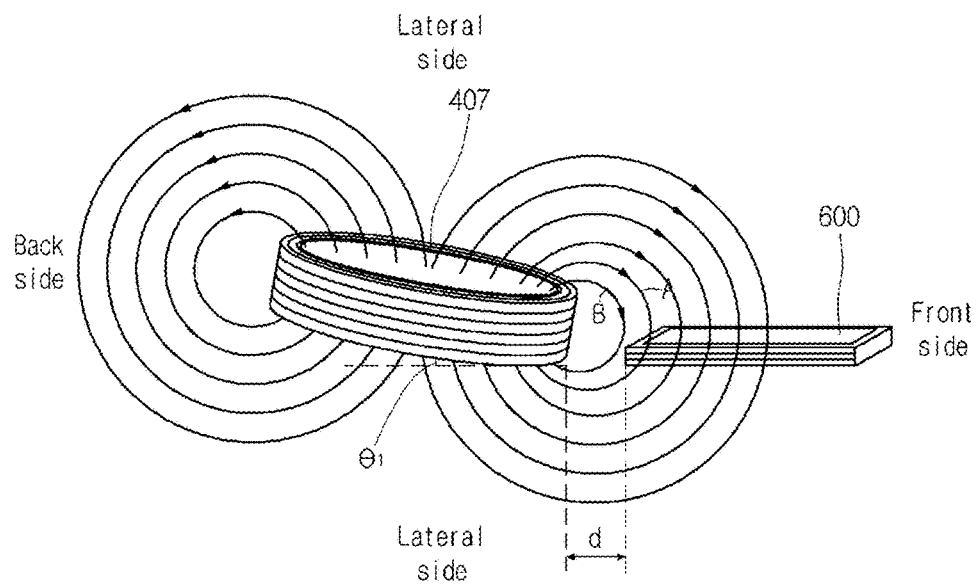
FIGS. 11 and 12 are diagrams illustrating a wireless power transmission procedure of a wireless power transmitter according to the third embodiment.
Figure 12:
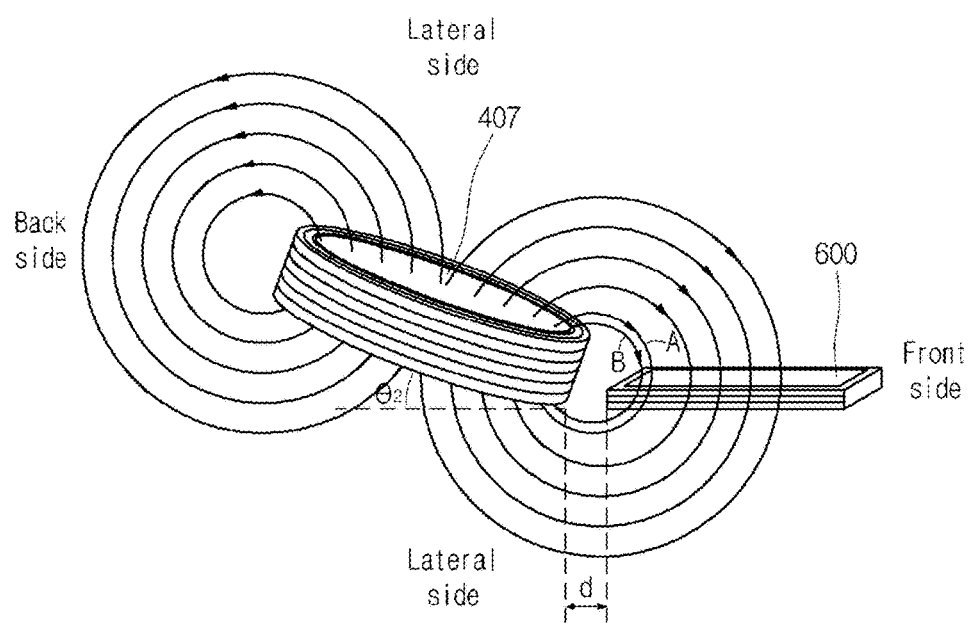

FIG. 9 is a view illustrating a structure of a wireless power transmitter 400 according to a third embodiment, FIG. 10 is a diagram illustrating a wireless power transmission procedure of a wireless power transmitter 400 according to the first embodiment, FIGS. 11 and 12 are diagrams illustrating a wireless power transmission procedure of a wireless power transmitter 400 according to the third embodiment, and FIG. 13 is a table illustrating power transmission efficiency when the wireless power transmitter 400 according to the third embodiment is used.

First, referring to FIG. 9, the wireless power transmitter 400 includes a power connecting unit 401, a first substrate 403, a transmission induction coil 405, a transmission resonance coil 407, a second substrate 409, a shielding unit 411, a transmission circuit unit 413, a receiving unit 415, and a support member 417. The constituent elements are substantially the same as those of FIG. 5.

The transmission resonance coil 407 may be inclined at a predetermined angle with respect to a horizontal line of a horizontal plane. In detail, the transmission resonance coil 407 may be inclined at a predetermined angle with respect to the horizontal line of a plane where the wireless power transmitter 400 is placed. It may be preferable that an angle between the transmission resonance coil 407 and the horizontal line is in the range of 0° to 30°.

One lateral side of the transmission resonance coil 407 may be inclined to have a preset angle with respect to a charging region to be used. If the transmission resonance coil 407 is inclined at the preset angle with respect to the horizontal line, the power can be transmitted with high efficiency to the wireless power receiver 300 placed at the charging region.

FIG. 10 illustrates a magnetic force line of a magnetic field generated from the transmission resonance coil 407 when the angle between the transmission resonance coil 407 and the horizontal line is 0°. FIG. 11 illustrates a magnetic force line of a magnetic field generated from the transmission resonance coil 407 when the angle between the transmission resonance coil 407 and the horizontal line is 10°. FIG. 12 illustrates a magnetic force line of a magnetic field generated from the transmission resonance coil 407 when the angle between the transmission resonance coil 407 and the horizontal line is 20°.

An electronic device 600 in FIGS. 10 to 12 may include the wireless power receiver 300 described in FIGS. 1 to 4, and may receive power using a magnetic field from the transmission resonance coil 407. The electronic device 600 may include a portable phone, a notebook computer, and a mouse, but the embodiment is not limited thereto. The electronic device 600 may include may include all devices capable of receiving the power from the wireless power transmitter 400.

Further, it is assumed in FIGS. 10 to 12 that a distance d between the transmission resonance coil 407 and the electronic device 600 is constant and the electronic device 600 is placed at a right side of the transmission resonance coil 407 in order to compare respective power transmission efficiencies with each other. In addition, in FIGS. 10 to 12, when the magnetic force line generated from the transmission resonance coil 407 passes through the electronic device 600, the power may be transmitted to the electronic device 600. When the magnetic force line generated from the transmission resonance coil 407 does not pass through the electronic device 600, the power may not be transmitted to the electronic device 600.

Referring to FIG. 10, the angle between the transmission resonance coil 407 and the horizontal line is 0°. In this case, some of a plurality of magnetic force lines generated from the transmission resonance coil 407 pass through the electronic device 600, but remaining magnetic force lines may not pass through the electronic device 600. That is, as shown in FIG. 10, a magnetic force line A and a magnetic force line B do not pass through the electronic device 600.

To the contrary, referring to FIG. 11, the angle between the transmission resonance coil 407 and the electronic device 600 is 10°. In this case, the magnetic force line A which does not pass through the electronic device 600 in FIG. 10 passes through the electronic device 600. That is, as the transmission resonance coil 407 is inclined toward the electronic device 600, the number of magnetic force lines directed to the electronic device 600 from among the magnetic force lines generated from the transmission resonance coil 407 is increased.

Moreover, referring to FIG. 12, the angle between the transmission resonance coil 407 and the electronic device 600 is 20°. In this case, the magnetic force line B which does not pass through the electronic device 600 in FIGS. 10 and 11 passes through the electronic device 600. That is because more magnetic force lines among the magnetic force lines generated from the transmission resonance coil 407 are directed to the electronic device 600 as the transmission resonance coil 407 is inclined toward the electronic device 600 as compared with a case of FIG. 11.

FIG. 13 is a table illustrating variations in the quality factor Q, a coupling coefficient, and power transmission efficiency when the angel of the transmission resonance coil 407 is changed from 0° to 39°. It is assumed that the electronic device 600 is placed at one lateral side of the transmission resonance coil 407, and an angle the transmission resonance coil 407 is changed while one lateral side of the transmission resonance coil 407 is inclined toward a charging region to be used, that is, the electronic device 600.

The quality factor Q may refer to an index of energy that may be stored in the vicinity of the wireless power transmitter or the wireless power receiver. The coupling coefficient represents the degree of inductive magnetic coupling between a transmission coil and a reception coil, and has a value of 0 to 1. The coupling coefficient may vary according to the relative position and the distance between the transmission coil and the reception coil.

The power transmission efficiency may refer to a ratio of power received by the wireless power receiver 300 mounted in the electronic device 600 to power transmitted from the wireless power transmitter 400. The power transmission efficiency depends on the quality factor Q and the coupling coefficient, and can be gradually improved as the values of the quality factor and the coupling coefficient between the transmission resonance coil 407 and the reception resonance coil 310 are increased.

As shown in FIGS. 10 to 12, power transmission efficiency at a front side corresponds to power transmission efficiency when the electronic device 600 is placed at a front side of the wireless power transmitter 400, power transmission efficiency at a side corresponds to power transmission efficiency when the electronic device 600 is placed at a right side or a left side of the wireless power transmitter 400, and power transmission efficiency at a back side corresponds to power transmission efficiency when the electronic device 600 is placed at a back side of the wireless power transmitter 400.

It is assumed that the same distance is set between the transmission resonance coil 407 and the electronic device 600 regardless of the position of the electronic device 600 at the front side, the lateral side, and the back side of the transmission resonance coil 407. Referring to FIG. 13, when the electronic device 600 is placed at the front side of the transmission resonance coil 407, as the angle between the transmission resonance coil 407 and the horizontal line is increased, the power transmission efficiency and the coupling coefficient may be increased but the quality factor Q may be reduced.

The coupling coefficient may be increased as the angle between the transmission resonance coil 407 and the horizontal line is increased because a greater amount of magnetic field formed in the transmission resonance coil 407 is transferred to the reception resonance coil 310 mounted in the electronic device 600. In addition, the quality factor Q may be reduced because a magnetic field formed in the transmission resonance coil 407 is absorbed in a metal under the influence of a metal component of the electronic device.

If the angle between the transmission resonance coil 407 and the horizontal line exceeds 30°, power transmission efficiency to the electronic device 600 placed at the front side of the wireless power transmitter 400 may be reduced under the influence of the quality factor Q rather than the coupling coefficient. In particular, if the angle between the transmission resonance coil 407 and the horizontal line exceeds 30°, the whole power transmission efficiency may be deteriorated due to the power transmission efficiency to the electronic device 600 placed at the lateral side and the back side may be reduced Meanwhile, if the angle between the transmission resonance coil 407 and the horizontal line is 3°, power transmission efficiency to the front side may be less than that of a case where the angle between the transmission resonance coil 407 and the horizontal line exceeds 30°. However, when taking into consideration the whole power transmission efficiency in the lateral side and the back side, the power transmission efficiency may be improved more than that of a case where the angle between the transmission resonance coil 407 and the horizontal line exceeds 30°.

Accordingly, it may be preferable in the embodiment that the angle between the transmission resonance coil 407 and the horizontal plane is in the range of 3° to 30°.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A wireless power transmitter for transmitting power to a wireless power receiver, the wireless power transmitter comprising:
   a first substrate;
   a support member disposed on an upper surface of the first substrate;
   a receiving unit having a cylindrical structure and vertically connected with the upper surface of the first substrate through the support member;
   a second substrate disposed on a shielding unit, wherein the shielding unit is disposed on an upper surface of an inner side of the second substrate and a side surface of the inner side of the second substrate;
   a transmission circuit unit converting power supplied by a power supply unit into power having a frequency of resonance and disposed on the second substrate;
   a transmission induction coil coupling the converted power and disposed on the upper surface of the first substrate;
   a transmission resonance coil disposed adjacent to the transmission induction coil to transfer the coupled power from the transmission induction coil to the wireless power receiver; and
   a power connecting unit receiving the power supplied by the power supply unit and transferring the power to the transmission circuit unit;
   wherein the shielding unit protects the transmission circuit unit by changing a direction of magnetic field formed in the transmission resonance coil,
   wherein the power connecting unit is disposed on the first substrate,
   wherein the power connecting unit is disposed inside the transmission resonance coil,
   wherein the transmission circuit unit is vertically spaced apart from the transmission resonance coil,
   wherein the transmission induction coil and the transmission resonance coil are disposed between the first substrate and the second substrate,
   wherein a ratio of a diameter of the second substrate to a diameter of the transmission resonance coil is 3:8, and
   wherein a vertical distance between the transmission circuit unit and the transmission resonance coil is in a range of 10 mm to 20 mm.

2. The wireless power transmitter of claim 1, wherein the transmission resonance coil is inclined at a predetermined angle with respect to a horizontal plane.

3. The wireless power transmitter of claim 2, wherein one lateral side of the transmission resonance coil is inclined at a preset angle toward a charging region.

4. The wireless power transmitter of claim 3, wherein the preset angle is in a range of 3° to 30°.

5. The wireless power transmitter of claim 1, wherein a diameter of the second substrate is 30 mm, and a diameter of the transmission resonance coil is 80 mm.

6. The wireless power transmitter of claim 1, wherein the transmission resonance coil transfers the coupled power to at least one wireless power receiver disposed at one side of the transmission resonance coil.

* * * * *